United States Patent
Broadhead et al.

(10) Patent No.: US 9,952,438 B1
(45) Date of Patent: Apr. 24, 2018

(54) AUGMENTED REALITY MAINTENANCE SYSTEM

(71) Applicant: The Boeing Company, Chicago, IL (US)

(72) Inventors: Eric Wayne Broadhead, Wichita, KS (US); Daniel Charles Braasch, Marysville, WA (US)

(73) Assignee: THE BOEING COMPANY, Chicago, IL (US)

( * ) Notice: Subject to any disclaimer, the term of this patent is extended or adjusted under 35 U.S.C. 154(b) by 371 days.

(21) Appl. No.: 13/663,143

(22) Filed: Oct. 29, 2012

(51) Int. Cl.
*G02B 27/01* (2006.01)

(52) U.S. Cl.
CPC .................. *G02B 27/0176* (2013.01)

(58) Field of Classification Search
USPC .......... 345/156, 8, 173; 356/141.4; 434/307; 358/93
See application file for complete search history.

(56) References Cited

U.S. PATENT DOCUMENTS

| | | | |
|---|---|---|---|
| 2003/0163591 A1* | 8/2003 | Loda | 709/250 |
| 2007/0226258 A1* | 9/2007 | Lambdin | G02B 23/2469 |
| 2008/0100570 A1* | 5/2008 | Friedrich et al. | 345/156 |
| 2008/0278821 A1* | 11/2008 | Rieger | 359/630 |
| 2011/0306986 A1* | 12/2011 | Lee et al. | 606/130 |
| 2012/0075168 A1* | 3/2012 | Osterhout et al. | 345/8 |

* cited by examiner

*Primary Examiner* — Shaheda Abdin
(74) *Attorney, Agent, or Firm* — Yee & Associates, P.C.

(57) ABSTRACT

A method and apparatus for performing a task. The task is performed using a tool. Information received by a display system from the tool is displayed on a viewing area that is substantially transparent in the display system. The viewing area is configured to cover an eye and display the information in the viewing area.

6 Claims, 8 Drawing Sheets

AUGMENTED REALITY MAINTENANCE SYSTEM

GOVERNMENT LICENSE RIGHTS

This application was made with United States Government support under contract number EOT-1503-4864-14482 awarded by the Department of Defense. The United States Government has certain rights in this application.

BACKGROUND INFORMATION

1. Field

The present disclosure relates generally to maintenance and, in particular, to performing maintenance using tools. Still more particularly, the present disclosure relates to a method and apparatus for presenting an augmented reality to an operator performing maintenance using a tool.

2. Background

Maintenance of an object such as an aircraft may involve many different types of tasks. For example, when performing aircraft maintenance, different tasks may include inspection, repair, modification, overhaul, and other suitable tasks.

When performing maintenance on an aircraft, various types of inspections may be performed. For example, nondestructive inspections may be performed using various tools. These tools may include, for example, a borescope, a mobile automated scanner (MAUS), an x-ray system, an eddy current inspection system, an ultrasonic inspection system, and other suitable types of nondestructive inspection systems. These inspections are performed to determine whether inconsistencies may be present on the aircraft that may need rework.

For example, eddy current inspections may be performed on metal skin panels to determine whether inconsistencies may be present and may require rework or replacement of skin panels. As another example, ultrasonic inspection may be performed on skin panels made of composite materials. These ultrasonic inspections may determine whether inconsistencies are present. When any inconsistency is present, rework of the skin panel may be performed by removing some layers in the composite skin panel to form a scarf and then placing a patch into the scarf. In some cases, replacement of the composite skin panel may occur depending on the size, type, or both size and type of inconsistency.

Depending on the location in which the inspections are performed, viewing the information generated by the scanners may be more difficult than desired. For example, when using an ultrasonic inspection system, the ultrasonic inspection system may take the form of an automated scanner system that may move over the surface of the aircraft. Viewing the information from this inspection may be more difficult than desired when the inspection is performed outside in bright sunlight.

In particular, information such as images or other data may be displayed on a laptop connected to the automated scanner system. The information may be difficult to see outdoors in bright sunlight.

Further, oftentimes, the operator of the mobile automated scanner may walk on the surface of the aircraft while the scanning occurs. The operator may follow the scanner to direct the movement of the mobile automated scanner if the mobile automated scanner has a movement system, move the mobile automated scanner if the mobile automated scanner is a portable device, mark areas for further inspection or rework, or perform other operations while walking on the surface of the aircraft.

In addition to difficulty in viewing the information outdoors in bright sunlight, an operator also may be unable to focus as much attention to features that may be present on the aircraft. For example, these features may be vortex generators, wing edges, electrical wires, open panels, and other features that may be present during the inspection. If the operator focuses on the information displayed on the laptop computer, the operator may not see some of these features and may unintentionally contact a feature. This unintentional contact may cause the operator to trip or fall. Additionally, the unintentional contact with the feature may require rework or replacement of the feature.

Moreover, performing maintenance operations may be more difficult than desired. In many cases, the number of operators qualified to perform various inspections on an aircraft may be limited. For example, a first operator may be qualified to perform inspections using eddy current testing systems while a second operator may be qualified to perform inspections using ultrasonic inspection systems.

If all of the aircraft to be inspected during a particular period of time require ultrasonic inspection, then only the second operator may be able to perform the inspections. As a result, inspections may take twice as long when only a single operator is available rather than when two operators are available to perform inspections of aircraft.

In addition, having sufficient numbers of operators that can perform the different types of inspections using the different types of equipment may be more expensive than desired. Costs may increase when additional training is needed for operators.

Further, hiring operators that are able to perform more types of inspections may be more expensive than operators who are not able to perform as many types of inspections. Therefore, it would be desirable to have a method and apparatus that takes into account at least some of the issues discussed above, as well as other possible issues.

SUMMARY

In one illustrative embodiment, an apparatus comprises a display system and a tool. The display system has a viewing area that is substantially transparent. The viewing area is configured to cover an eye. The display system is further configured to display information for a task in the viewing area. The tool is configured for use in the task. The tool is in communication with the display system.

In another illustrative embodiment, a task system comprises a plurality of tool systems, a task database, and a task manager. A tool system in the plurality of tool systems comprises a display system and a tool. The display system has a viewing area that is substantially transparent. The viewing area is configured to cover an eye. The display system is further configured to display information for a task in the viewing area. The tool is configured for use in the task. The tool is in communication with the display system. The task manager is configured to communicate with the plurality of tool systems. The task manager is further configured to manage tasks performed with the plurality of tool systems using the task database.

In yet another illustrative embodiment, a method for performing a task is present. The task is performed using a tool. Information received by a display system from the tool is displayed on a viewing area that is substantially transparent in the display system. The viewing area is configured to cover an eye and display the information in the viewing area.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that many of the currently used systems for performing inspections and other operations during maintenance of a product may be redesigned to provide easier viewing of data. Further, inspection systems and other systems used during maintenance also may be designed to allow for operators to view information as well as the surroundings. In this manner, operators may avoid undesired contact with features on a product or other object. Additionally, the illustrative embodiments also recognize and take into account that currently used systems may be designed to allow for operation of equipment for which an operator may not have a desired level of knowledge or experience.

In one or more illustrative embodiments, an apparatus comprises a display system and a tool. The display system is operably connected to the tool. In other words, the display system and the tool may exchange information with each other. The display system has a viewing area that is substantially transparent. The viewing area is configured to cover an eye. Further, the display system is configured to display information for a task in the viewing area. The tool is configured for use in the task.

In these illustrative examples, the viewing area may display information received from the tool about a maintenance task. Further, the viewing area also may display information about operating the tool in some illustrative examples. The tool also may receive information used to perform operations in a manner that requires less input from the operator of the tool.

Figure 1:
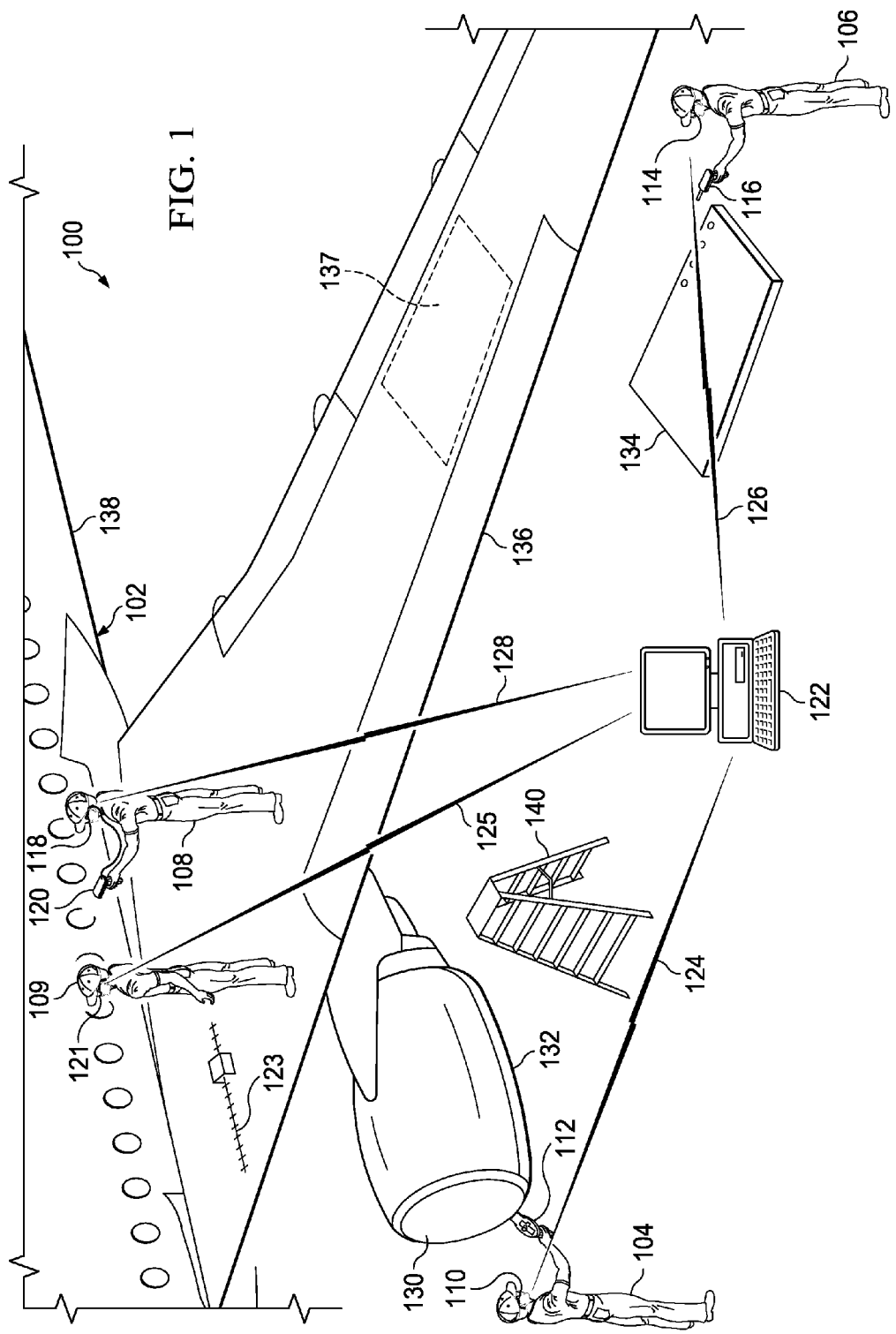
FIG. 1 is a pictorial illustration of a maintenance environment in accordance with an illustrative embodiment.

With reference now to the figures and, in particular, with reference to FIG. 1, a pictorial illustration of a maintenance environment is depicted in accordance with an illustrative embodiment. In this depicted example, maintenance environment 100 is an example of an environment in which one or more illustrative embodiments may be implemented.

As depicted, aircraft 102 is located in maintenance environment 100. Operator 104, operator 106, and operator 108 may perform various tasks on aircraft 102 in these illustrative examples. In this particular example, the tasks are maintenance tasks.

A task is a piece of work to be performed or undertaken. A task may be comprised of one or more operations. The tasks that may be performed on aircraft 102 may include, for example, without limitation, at least one of inspection, rework, modification, upgrades, overhaul, manufacture, and other suitable tasks on aircraft 102.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. In other examples, "at least one of" may be, for example, without limitation, two of item A, one of item B, and ten of item C; four of item B and seven of item C; and other suitable combinations.

As depicted, operator 104 has augmented reality glasses 110 and borescope 112. Operator 106 has augmented reality glasses 114 and drill 116. Operator 108 has augmented reality glasses 118 and handheld nondestructive inspection system 120. Operator 109 has augmented reality glasses 121 and automated nondestructive inspection system 123.

In these illustrative examples, the augmented reality glasses are operably connected to corresponding tools. In other words, a pair of augmented reality glass may exchange information with a tool. For example, borescope 112 may send information to augmented reality glasses 110, augmented reality glasses 110 may send information to borescope 112, or some combination thereof. The communication may be facilitated through a communications medium such as at least one of a wired cable, an optical fiber, a wireless communications link, and other suitable types of media.

In this illustrative example, operator 104 may use borescope 112 to perform inspections of various portions of aircraft 102. For example, borescope 112 may be used to inspect the surface of engine inlet 130 for engine 132 of aircraft 102. In another illustrative example, borescope 112 may be placed into an opening in engine 132 to perform inspections of interior portions of engine 132. Similar visual inspections may be made in other portions of aircraft 102.

Operator 106 may operate drill 116 to form holes for fastening components. In this illustrative example, operator 106 may form holes in new skin panel 134 to be placed onto wing 136 of aircraft 102. New skin panel 134 is selected to replace skin panel 137 on wing 136.

Operator 108 may operate handheld nondestructive inspection system 120 to inspect fuselage 138 of aircraft 102 for inconsistencies. Operator 108 may move handheld nondestructive inspection system 120 over fuselage 138 to perform an inspection of fuselage 138. Handheld nondestructive inspection system 120 may be a handheld ultrasonic transducer, eddy current transducer, or other nondestructive inspection sensor in these illustrative examples.

Operator 109 may operate automated nondestructive inspection system 123 to inspect wing 136 of aircraft 102 for inconsistencies. Automated nondestructive inspection system 123 may be an automated ultrasonic, eddy current, or other nondestructive inspection sensor that moves along a track or other movement device over the surface of wing 136 or fuselage 138. In other words, information is generated as the ultrasonic transducer, eddy current transducer, or other automated nondestructive inspection sensor in automated nondestructive inspection system 123 moves along the surface of wing 136 or fuselage 138. When the automated nondestructive inspection system sensor in automated nondestructive inspection system 123 has completed inspection of the location on wing 136 or fuselage 138, operator 109 may move automated nondestructive inspection system 123 to a different location on wing 136 or fuselage 138. In this manner, automated nondestructive inspection system 123 may make automatic measurements along a portion of wing 136 or fuselage 138 but still may be movable to other portions of wing 136 or fuselage 138 by operator 109.

In these illustrative examples, the different tools used by the operators are in communication with the corresponding augmented reality glasses and send information to the augmented reality glasses for display to the operators while performing tasks on aircraft 102. This information may take a number of different forms depending on the type of tool being used, the task being performed, both the type of tool being used and the task being performed, or other suitable factors.

For example, borescope 112 may send images to augmented reality glasses 110 for viewing by operator 104. These images may be viewed by operator 104 to determine whether inconsistencies are present in engine inlet 130 in aircraft 102.

As another example, drill 116 may send operating information to augmented reality glasses 114 for viewing by operator 106. For example, drill 116 may send operating information such as revolutions per minute, temperature of the drill bit, and other suitable information. This operating information may be used by operator 106 to make adjustments to drilling operations on new skin panel 134.

As depicted, handheld nondestructive inspection system 120 may send information to augmented reality glasses 118 for viewing by operator 108. This information may include, for example, images such as c-scans or other suitable types of information generated by handheld nondestructive inspection system 120.

Further, automated nondestructive inspection system 123 may send information to augmented reality glasses 121 for viewing by operator 109. This information may include, for example, images such as c-scans or other suitable types of information generated by automated nondestructive inspection system 123.

In these illustrative examples, the augmented reality glasses used by the operators allow the operators to see the information as well as different objects in maintenance environment 100 around the operators. In other words, the display of information on the augmented reality glasses is such that the operators may still see objects around the operators.

For example, operator 104 may see different parts of engine inlet 130 to position borescope 112 with respect to engine inlet 130 while looking at images generated by borescope 112 through augmented reality glasses 110. In these illustrative examples, augmented reality glasses 110 are configured to display images generated by borescope 112 on augmented reality glasses 110 in a manner that also allows operator 104 to see borescope 112 and other objects in maintenance environment 100. In other words, the display of images generated by borescope 112 does not cover all of augmented reality glasses 110 in a manner that undesirably reduces the visibility that operator 104 has for viewing maintenance environment 100 to move and operate borescope 112.

In another illustrative example, the operating information for drill 116 may be displayed on a portion of augmented reality glasses 114 to operator 106. Operator 106 may see drill 116 through augmented reality glasses 114 and the information received from drill 116 at the same time. The display of the information from drill 116 is displayed such that operator 106 may still position and operate drill 116. Further, operator 106 also may see other objects around operator 106 while performing a task using drill 116.

In this illustrative example, images generated by a handheld nondestructive inspection ultrasonic transducer, eddy current transducer, or other type of sensor in handheld nondestructive inspection system 120 are displayed on augmented reality glasses 118 in a manner such that operator 108 may operate the handheld nondestructive inspection ultrasonic transducer, eddy current transducer, or other type of sensor in handheld nondestructive inspection system 120. In particular, operator 108 may see the handheld nondestructive inspection system ultrasonic transducer, eddy current transducer, or other type of sensor in handheld nondestructive inspection system 120 and may move or direct movement of handheld nondestructive inspection system 120. This operation of handheld nondestructive inspection system 120 may occur while viewing information generated by the handheld nondestructive inspection system ultrasonic transducer, eddy current transducer, or other type of sensor in handheld nondestructive inspection system 120.

As depicted, images generated by automated nondestructive inspection system 123 with an ultrasonic transducer, eddy current transducer, or other nondestructive inspection sensor are displayed on augmented reality glasses 121 in a manner such that operator 109 may operate automated nondestructive inspection system 123. In particular, operator 109 may see automated nondestructive inspection system 123 and may move automated nondestructive inspection system 123 after automated nondestructive inspection system 123 has finished inspection of a portion of wing 136 or fuselage 138. Additionally, operator 109 may view an image from automated nondestructive inspection system 123 and send a command to automated nondestructive inspection system 123 to stop or rescan the area. With the use of augmented reality glasses 121, operator 109 may maneuver around automated nondestructive inspection system 123 while viewing information generated by an ultrasonic transducer, eddy current transducer, or other nondestructive inspection sensor in nondestructive inspection system 123.

Additionally, these augmented reality glasses may communicate with computer 122 in maintenance environment 100. As depicted, augmented reality glasses 110 communicate with computer 122 using wireless communications link 124. Augmented reality glasses 114 communicate with computer 122 using wireless communications link 126 and augmented reality glasses 118 communicate with computer 122 using wireless communications link 128. Augmented reality glasses 121 communicate with computer 122 using wireless communications link 125.

Computer 122 may store information received from the augmented reality glasses. Further, computer 122 also may send information to at least one of the augmented reality glasses and the tools to manage the performance of tasks on aircraft 102.

With respect to information sent to the augmented reality glasses, computer 122 may send information about aircraft 102 that may be displayed on augmented reality glasses 110 that provides instructions to operator 104 for operation of borescope 112. In a similar fashion, computer 122 may send instructions to augmented reality glasses 114 for display to operator 106 for operations to perform drilling with drill 116. Computer 122 also may send instructions to augmented reality glasses 118 for display to operator 108 to operate handheld nondestructive inspection system 120. In addition, computer 122 may send instructions to augmented reality glasses 121 for display to operator 109 to operate or relocate automated nondestructive inspection system 123.

In one illustrative example, the augmented reality glasses may include a camera system that sends video data of tasks performed by the operators on aircraft 102. This camera system may include one or more cameras. In this manner, a record may be kept for verifying various tasks performed on aircraft 102.

Further, augmented reality glasses 110 may send images received from borescope 112 to computer 122 over wireless communications link 124. In a similar fashion, augmented reality glasses 114 may send operating parameters received from drill 116 to computer 122 over wireless communications link 126. Images and other data received by augmented reality glasses 118 from handheld nondestructive inspection system 120 may be sent to computer 122 over wireless communications link 128. Similarly, images and other data received by augmented reality glasses 121 from automated nondestructive inspection system 123 may be sent to computer 122 over wireless communications link 125.

Thus, operator 104, operator 106, operator 108, and operator 109 may perform different tasks on aircraft 102 in maintenance environment 100 more efficiently through the use of augmented reality glasses 110, augmented reality glasses 114, augmented reality glasses 118, and augmented reality glasses 121 that are in communication with borescope 112, drill 116, handheld nondestructive inspection system 120, and automated nondestructive inspection system 123, respectively. Further, operator 104, operator 106, operator 108, and operator 109 also may have more mobility to avoid unintended contact with features on aircraft 102 or elsewhere in maintenance environment 100 while performing tasks on aircraft 102 through the use of augmented reality glasses 110, augmented reality glasses 114, augmented reality glasses 118, and augmented reality glasses 121, respectively.

For example, ladder 140 may be positioned close to wing 136 such that operator 104, operator 108 and operator 109 may reach wing 136 and fuselage 138 for inspection or work process. Operator 104 may be located on ladder 140 using borescope 112, handheld nondestructive inspection system 120, automated nondestructive inspection system 123, or other manufacturing tools. With the use of augmented reality glasses 110, operator 104, operator 108, and operator 109 may avoid unintended falls from ladder 140 while still viewing data from borescope 112, handheld nondestructive inspection system 120, automated nondestructive inspection system 123, or other manufacturing tools in these illustrative examples.

Figure 2:
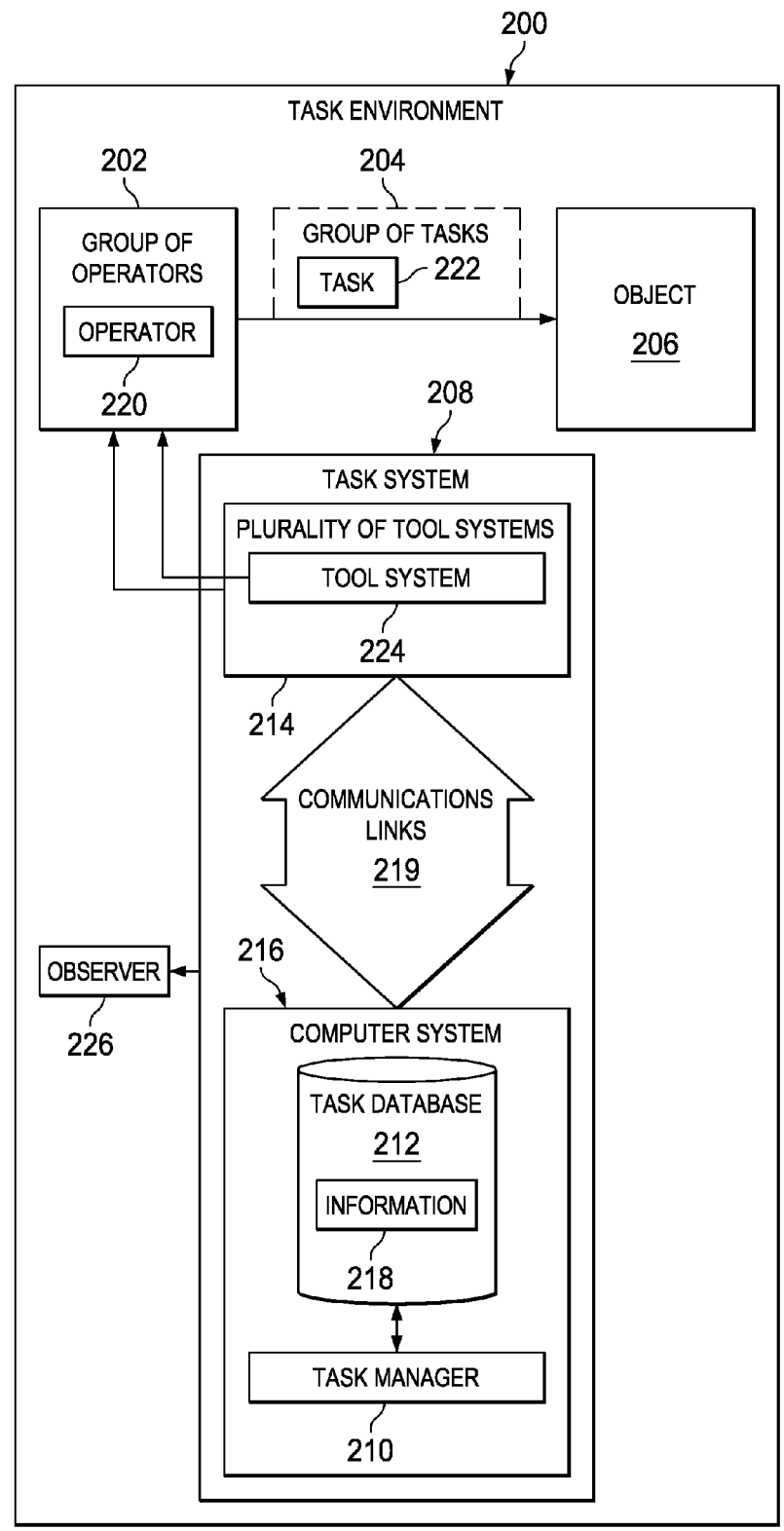
FIG. 2 is an illustration of a block diagram of a maintenance environment in accordance with an illustrative embodiment.

Turning now to FIG. 2, an illustration of a block diagram of a maintenance environment is depicted in accordance with an illustrative embodiment. In this depicted example, maintenance environment 100 in FIG. 1 is an example of a physical implementation for task environment 200 illustrated in block form in FIG. 2.

In this illustrative example, group of operators 202 in task environment 200 may perform group of tasks 204 on object 206. In this illustrative example, object 206 may take various forms such as aircraft 102 in FIG. 1. As used herein, a "group of" when used with reference to items means one or more items. For example, group of operators 202 is one or more operators.

In these illustrative examples, group of tasks 204 may be performed using task system 208. Task system 208 includes a number of different components. As depicted, task system 208 includes task manager 210, task database 212, and plurality of tool systems 214.

Object 206 may take a number of different forms depending on the particular implementation. For example, object 206 may be selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, a building, a fuselage, an engine, a frame, and other suitable types of objects.

Task manager 210 may be implemented using software, hardware, or a combination of the two. In these illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In this illustrative example, task manager 210 may be implemented in computer system 216. Computer system 216 may be comprised of one or more computers. When more than one computer is present in computer system 216, those computers are operably connected to each other and may communicate using a communications medium such as a network.

In these illustrative examples, task database 212 may be located inside of computer system 216. Task database 212 may be in one location or may be distributed over multiple locations. When more than one computer is present in computer system 216, those computers may be in different geographic locations.

In this illustrative example, task database 212 stores information 218. Information 218 may be generated by plurality of tool systems 214 or may be information that may be sent to plurality of tool systems 214 to perform group of tasks 204 on object 206.

In these illustrative examples, task manager 210 is configured to manage the performance of group of tasks 204 performed by plurality of tool systems 214 using task database 212. For example, task manager 210 may send information 218 to plurality of tool systems 214 over communications links 219 for use in performing tasks. Task manager 210 may also send information 218 to a single tool system in plurality of tool systems 214 over communications links 219 for use in performing a task.

In these examples, communications links 219 takes the form of wireless communications links. Of course, other types of communications links may be used such as wired communications links and optical communications links. Further, information 218 generated by plurality of tool systems 214 may be received by task manager 210 and stored in task database 212.

With the use of task manager 210, group of tasks 204 may be performed more desirably by group of operators 202. For example, information 218 may be used by group of operators 202 who may not have a desired level of experience or knowledge about plurality of tool systems 214.

With information 218, group of operators 202 may perform group of tasks 204 using plurality of tool systems 214 with a desired level of accuracy and efficiency. As a result, group of operators 202 may be able to perform more types of tasks in group of tasks 204 using different tool systems in plurality of tool systems 214. For example, operator 220 in group of operators 202 may perform task 222 in group of tasks 204 using tool system 224 in plurality of tool systems 214 even though operator 220 is unfamiliar with tool system 224, task 222, or both tool system 224 and task 222.

Task manager 210 sends information 218 needed by operator 220 to perform task 222 using tool system 224. With the use of information 218, operator 220 may be able to perform more types of tasks in group of tasks 204. As a result, the performance of group of tasks 204 may not be constrained by the skills and training of operators in group of operators 202.

Thus, group of tasks 204 on object 206 may be performed more quickly than with currently used systems. Further, the cost for training group of operators 202 also may be reduced through the use of task manager 210.

In these illustrative examples, with task system 208, monitoring of group of tasks 204 performed by group of operators 202 using plurality of tool systems 214 may occur more easily. For example, observer 226 may observe the performance of task 222 by operator 220 using tool system 224. Observer 226 may observe the performance of task 222 using information 218 in the form of video data. In this manner, observer 226 may also provide assistance or instructions to operator 220 while operator 220 performs task 222 using tool system 224.

In some illustrative examples, when more than one operator in group of operators 202 is performing group of tasks 204 for object 206, observer 226 may monitor and instruct multiple operators at substantially the same time, depending on the particular implementation. In this manner, observer 226 with a desired level of training and expertise may be used to direct operators in group of operators 202 with less skill to perform group of tasks 204 more efficiently.

Figure 3:
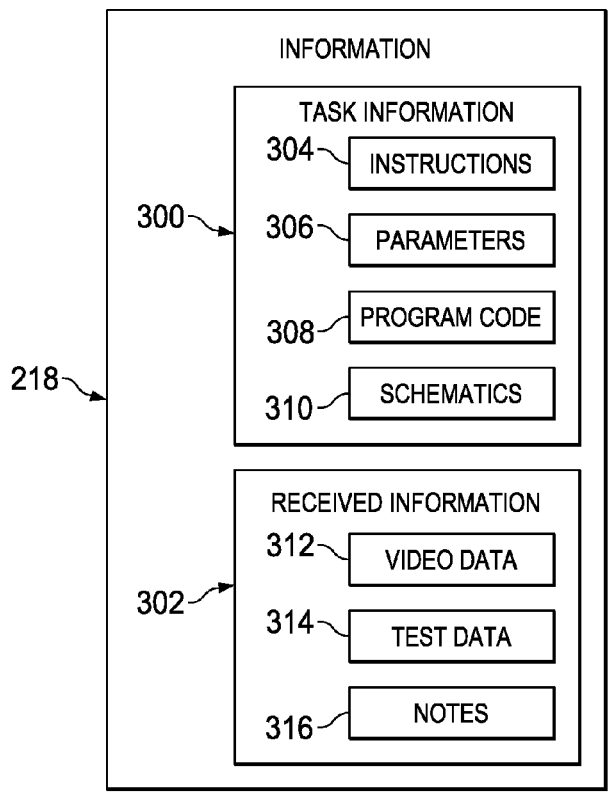
FIG. 3 is an illustration of a block diagram of information that may be stored in a task database in accordance with an illustrative embodiment.

Turning now to FIG. 3, an illustration of a block diagram of information that may be stored in a task database is depicted in accordance with an illustrative embodiment. In this depicted example, examples of information 218 that may be stored in task database 212 in FIG. 2 are illustrated.

As depicted, information 218 may be comprised of a number of different types of information. In this illustrative example, information 218 may include task information 300, received information 302, or some combination thereof.

Task information 300 may include a number of different types of information. In this illustrative example, task information 300 includes at least one of instructions 304, parameters 306, program code 308, schematics 310, and other suitable types of information. Instructions 304 are instructions that may be displayed on tool system 224 to operator 220 in FIG. 2. Instructions 304 may provide instructions for performing task 222 in these illustrative examples. Instructions 304 may be displayed to operator 220 while operator 220 performs task 222 using tool system 224 in task environment 200 in FIG. 2. Instructions 304 may be provided in different forms such as moving graphical overlays on object 206, stationary graphical overlays on object 206, words, graphics, other forms of communication or combinations thereof.

Parameters 306 are parameters that may be set for tool system 224. Parameters 306 may be set automatically by task manager 210 without needed operator input from operator 220. In other illustrative examples, parameters 306 may be displayed to operator 220. In turn, operator 220 may set parameters 306 in tool system 224 after viewing parameters 306.

Parameters 306 may include, for example, without limitation, at least one of revolutions per minute for a drill, drill bit temperature, depth of penetration of the drill bit, frequency for an ultrasonic inspection system, program number for the ultrasonic inspection system, scan speed for the ultrasonic inspection system, light intensity for a borescope, color balance of the borescope, focus of the borescope, inch pounds of torque for a torque wrench, deflection, inch pounds of tension on cables, and other suitable parameters.

Program code 308 may be used by tool system 224 to perform task 222. For example, program code 308 may be a program for a drill that sets drilling speeds and depths for a stackup of different types of materials in which holes may be formed.

Schematics 310 may be a representation of a portion or all of object 206 on which task 222 is to be performed by tool system 224. Schematics 310 may be displayed to operator 220 while performing task 222 on object 206.

Received information 302 may include at least one of video data 312, test data 314, notes 316, and other suitable types of information. Video data 312 may be generated by tool system 224 while operator 220 performs task 222. In this manner, video data 312 may form a record of task 222 performed using tool system 224.

Test data 314 may be data generated by tool system 224 while operator 220 performs task 222. For example, test data 314 may be ultrasonic data generated by tool system 224 when task 222 is an inspection task. In another example, test data 314 may be currents detected by an eddy current inspection system in tool system 224.

As depicted, notes 316 may be notes generated by operator 220. Notes 316 may be notes entered by operator 220 into tool system 224 through an input device. In other illustrative examples, operator 220 may make verbal notes that are recorded by tool system 224 and sent to task manager 210 for inclusion in task database 212.

Figure 4:
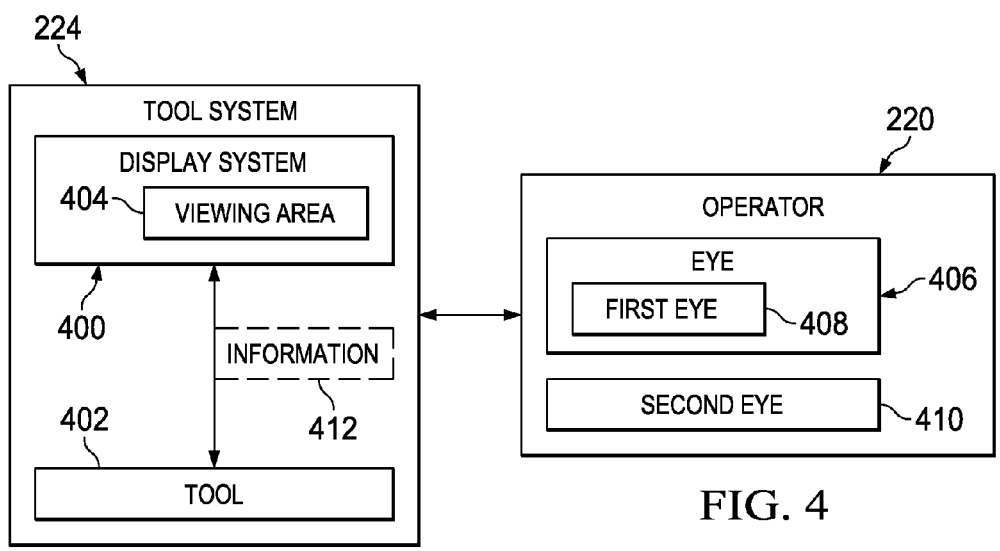
FIG. 4 is an illustration of a block diagram of a tool system in accordance with an illustrative embodiment.

With reference now to FIG. 4, an illustration of a block diagram of a tool system is depicted in accordance with an illustrative embodiment. As depicted, tool system 224 in plurality of tool systems 214 includes display system 400 and tool 402. Display system 400 has viewing area 404.

In these illustrative examples, viewing area 404 is a substantially transparent viewing area. Viewing area 404 is configured to cover eye 406 of operator 220. Eye 406 may be first eye 408 and viewing area 404 also may cover second eye 410 of operator 220. In these illustrative examples, viewing area 404 is configured to display information 412. Information 412 may be information received from tool 402.

As depicted, display system 400 is hardware and may include software. Display system 400 may be implemented using a number of different types of devices. For example, display system 400 may be implemented using at least one of augmented reality glasses, a contact lens display, and other suitable types of devices.

When display system 400 includes augmented reality glasses, the augmented reality glasses may be worn by operator 220. The augmented reality glasses allow operator 220 to see task environment 200 around operator 220 in addition to information 412 in these illustrative examples. In other words, the display of information 412 does not cover all of eye 406 and allows eye 406 to see objects and features around operator 220 in addition to information 412 in these illustrative examples.

As depicted, a contact lens display may be worn in at least one of first eye 408 and second eye 410. In a similar fashion to the augmented reality glasses, the contact lens display is configured to display information 412 to operator 220 while operator 220 performs task 222 using tool 402 in tool system 224. In these illustrative examples, the display of information 412 also allows operator 220 to see objects and features around operator 220 in addition to information 412. In this manner, operator 220 may have peripheral vision or other vision that allows operator 220 to operate tool system 224 in a desired manner.

As depicted, tool 402 may take a number of different forms. For example, tool 402 may be selected from one of a borescope, a mobile automated scanner, an x-ray system, an eddy current inspection system, an ultrasonic inspection system, a thermographic inspection system, a tomography inspection system, a drill, a torque wrench, and other suitable types of tools.

Figure 5:
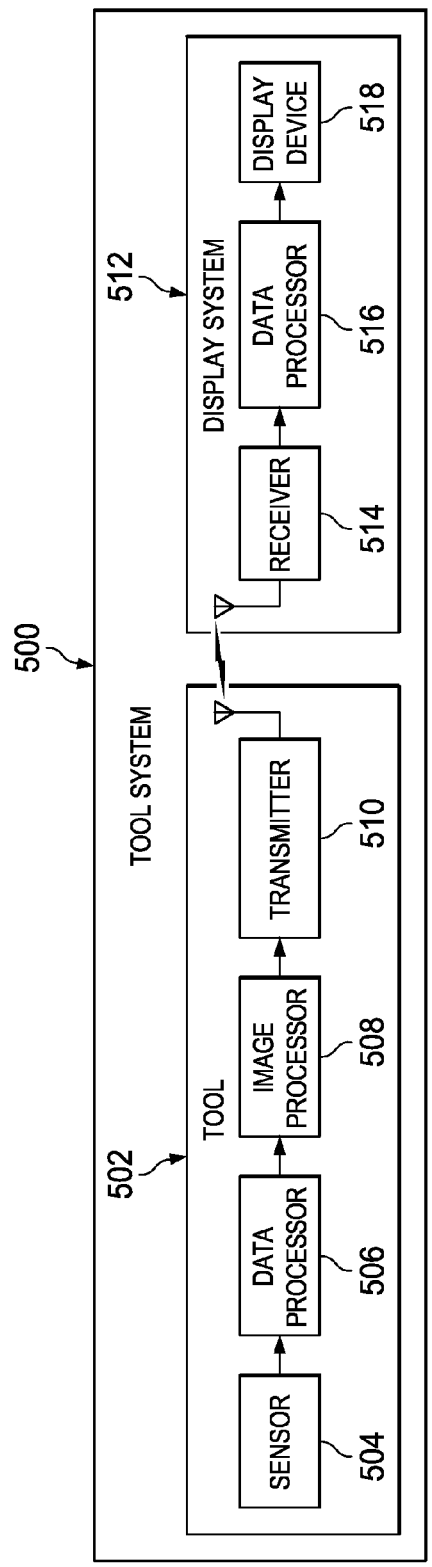
FIG. 5 is an illustration of a block diagram of an example of a tool system in accordance with an illustrative embodiment.

With reference now to FIG. 5, an illustration of a block diagram of an example of a tool system is depicted in accordance with an illustrative embodiment. Tool system 500 is an example of an implementation for tool system 224 in FIG. 2. In this illustrative example, tool system 500 includes tool 502 in the form of an inspection system.

As depicted, tool 502 may be comprised of a number of different hardware components. In this example, tool 502 includes sensor 504, data processor 506, image processor 508, and transmitter 510.

In this illustrative example, tool system 500 also includes display system 512. Display system 512 includes receiver 514, data processor 516, and display device 518.

As depicted, sensor 504 may take a number of different forms. For example, sensor 504 may be selected from one of a camera system, an eddy current probe, an ultrasonic transducer, and other suitable types of sensors. In these illustrative examples, sensor 504 is connected to data processor 506. Sensor 504 sends data to data processor 506.

Data processor 506 is configured to process data generated by sensor 504. Data processor 506 is implemented using hardware and may include software. For example, data processor 506 may be a hardware circuit such as an application specific integrated circuit (ASIC), a processor unit, a digital signal processor, and other suitable types of devices.

Data processor 506 may perform different types of operations. These operations may include, for example, without limitation, at least one of frequency noise filtering, amplification, non-inverting amplification, inverting amplification, integrated amplification, differential amplification, time delays, signal flow, signal summation, rectification, solid state device processing, logic functions, computer processing, software processing, digital compression, color correction, image formatting, computation of customer cost benefits for modifications and maintenance times, storage and recording of operator notes, cataloging data entries, voice-to-text processing, digital signature, updating maintenance logs, processing a flight readiness check, analyzing and updating aircraft weight and balance information, reformatting data, recalculating weight and balance values when certain components are added or removed from the aircraft, calculating and analyzing other maintenance parameters, and other suitable operations.

Image processor 508 is connected to data processor 506 and receives processed data from data processor 506. Image processor 508 is implemented using hardware and may include software. For example, image processor 508 may be implemented using a hardware circuit such as an application specific integrated circuit, a processor unit, a digital signal processor, and other suitable types of devices. In this illustrative example, image processor 508 is configured to generate an image from the data processed by data processor 506.

Transmitter 510 is connected to image processor 508 and receives images from image processor 508. Transmitter 510 is configured to transmit images to display system 512 over wireless communications link 520.

In display system 512, receiver 514 receives the image sent by transmitter 510 in tool 502. Receiver 514 is connected to data processor 516. The image received from tool 502 by receiver 514 is sent to data processor 516. Data processor 516 is implemented using hardware and may include software. Data processor 516 may be an application specific integrated circuit, a processor unit, a digital signal processor, and other suitable types of devices. Data processor 516 is configured to format the image for display on display device 518.

In these illustrative examples, display device 518 is a hardware device and may include software. As depicted, display device 518 is configured to display the image received from tool 502 to the operator.

The illustration of task environment 200 and the different components in FIGS. 2-5 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, task manager 210 and task database 212 may be omitted from task environment 200. In other words, tool system 224 may be used as a stand-alone tool without receiving information from other sources other than the tool in tool system 224.

Further, although task environment 200 has been described as being implemented in a maintenance environment, task environment 200 may be applied during other types of tasks. For example, task environment 200 may be used in a manufacturing environment as well as other environments in addition to or in place of maintenance environments.

Yet another illustrative example, task manager 210 may provide instructions to tool system 224 and in particular to display system 400 without display system 400 communicating with tool 402. For example information 218 in the form of instruction on where holes should be drilled on an object such as a skin panel may be sent for display to display system 400.

These instructions may comprise graphical indicators displayed on display system 400 such that the graphical indicators are aligned with locations where the holes should be drilled. As the operator moves, the graphical indicators may also move such that the graphical indicators remain on the locations in the object where the holes are to be drilled using tool 402. In other cases, the instructions may be blue prints, diagrams, text or other suitable form of instructions.

Figure 6:
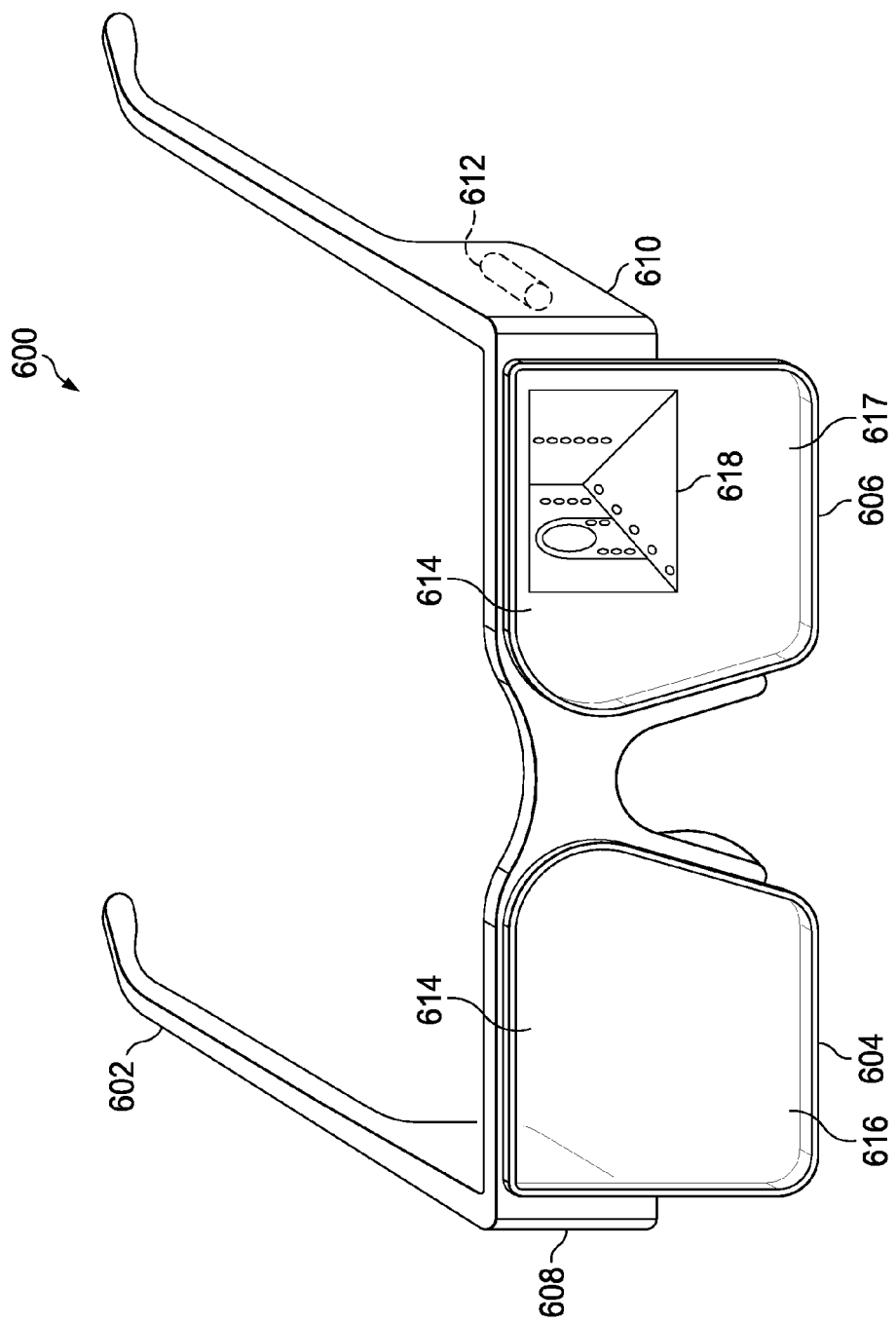
FIG. 6 is an illustration of a display system in accordance with an illustrative embodiment.

Turning now to FIG. 6, an illustration of a display system is depicted in accordance with an illustrative embodiment. In this depicted example, augmented reality glasses 600 are an example of one implementation for display system 400 in FIG. 4 and is a more detailed example of how augmented reality glasses 110, augmented reality glasses 114, augmented reality glasses 118, and augmented reality glasses 121 may be implemented in FIG. 1.

In this depicted example, augmented reality glasses 600 include frame 602, lens 604, lens 606, projector 608, projector 610, and camera 612. Lens 604 and lens 606 are associated with frame 602 of augmented reality glasses 600.

When one component is "associated" with another component, the association is a physical association in the depicted examples. For example, a first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

As depicted, lens 604 and lens 606 have viewing area 614. In other words, viewing area 614 may be formed by lens 604 and lens 606. In some illustrative examples, viewing area 614 may only present in one of lens 604 and lens 606. In this type of implementation, the other lens does not display information.

Information may be displayed to an operator in viewing area 614. Viewing area 614 is a substantially transparent viewing area in these illustrative examples.

Projector 608 and projector 610 also are associated with frame 602 of augmented reality glasses 600. Projector 608 and projector 610 are configured to receive information over a wireless communications link and display the information in viewing area 614 in lens 604 and lens 606, respectively.

Projector 608 is configured to receive information over a wireless communications link and display the information in section 616 of viewing area 614 in lens 604. Projector 610 is configured to receive information over a wireless communications link and display the information in section 617 of viewing area 614 in lens 606. Of course, in other illustrative examples, projector 608 and projector 610 may be connected by a wire or optical fiber to a transceiver that is configured to receive and transmit information.

Camera 612 is also associated with frame 602 in augmented reality glasses 600. Camera 612 is configured to generate video data. Of course, camera 612 may generate still images in addition to or in place of video data. Camera 612 also may include a transmitter configured to transmit the images over a wireless communications link.

In these illustrative examples, camera 612 may be used to generate a record of operations in a task performed by an operator. Further, the video data may be viewed by an observer that may monitor and may provide assistance during the performance of the task by the operator.

In this illustrative example, image 618 is displayed in a portion of section 617 in viewing area 614 of lens 606. In this example, image 618 is an image generated by a digital borescope. Image 618 may be an image from video data generated by the digital borescope. As depicted, image 618 is displayed in viewing area 614 while the operator performs an inspection using the digital borescope in this illustrative example. In other words, image 618 may be displayed in real-time as the digital borescope generates image 618.

As can be seen, the display of image 618 does not cover all of section 617 of viewing area 614 of lens 606. In this manner, an operator wearing augmented reality glasses 600 may view image 618 while performing an inspection using a digital borescope. Image 618 is displayed in viewing area 614 in a manner that allows the operator to see other objects and operate the borescope.

Of course, other types of information may be displayed in viewing area 614. In other illustrative examples, instructions, checklists, and other information may be displayed to the operator while the operator performs tasks. Further, image 618 could cover all of viewing area 614.

In some illustrative examples, augmented reality glasses may be used with other devices such as input devices. These devices may be used to input information, record notes, store data, or some combination thereof. For example, an operator may use a tablet or mobile phone to make notes for a flight log. Data processor 506 may then use that information to generate additional instructions, alerts, or operations to be performed.

In other illustrative examples, a voice-to-text feature with a microphone in augmented reality glasses 600 may use auditory data to record operator notes. In this case, data processor 506 may translate this auditory data to text form and add the data to a logbook. Of course, augmented reality glasses 600 may be used with other types of devices, depending on the particular implementation.

The illustration of augmented reality glasses 600 in FIG. 6 is not mean to limit the manner in which other augmented reality glasses may be implemented. For example, augmented reality glasses 600 may also be used to communicate with other devices or people using a communications system.

For example, augmented reality glasses 600 may include input devices such as, for example, a microphone, or other suitable input devices. Additionally, augmented reality glasses 600 may include output devices that allow an operator wearing augmented reality glasses 600 to hear communications from other devices or people. These output devices may include, for example, ear phones, ear plugs, ear buds, a headset, or some other suitable type of device.

With the use of a microphone and ear phones, augmented reality glasses 600 may allow two-way communication between devices. Of course, a communications system may be located separately from augmented reality glasses 600, depending on the particular implementation.

The different components shown in FIG. 1 and FIG. 6 may be combined with components in FIGS. 2-5, used with components in FIGS. 2-5, or a combination of the two. Additionally, some of the components in FIG. 1 and FIG. 6 may be illustrative examples of how components shown in block form in FIGS. 2-5 can be implemented as physical structures.

Figure 7:
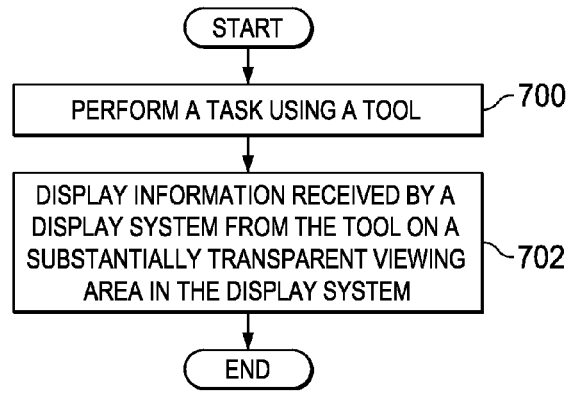
FIG. 7 is an illustration of a flowchart of a process for performing a task in accordance with an illustrative embodiment.

Turning now to FIG. 7, an illustration of a flowchart of a process for performing a task is depicted in accordance with an illustrative embodiment. The different operations illustrated in FIG. 7 may be performed using task system 208 in FIG. 2. In particular, the different operations may be performed using tool system 224 in FIG. 2.

The process begins by performing a task using a tool (operation 700). The process displays information received by a display system from the tool on a substantially transparent viewing area in the display system (operation 702) with the process terminating thereafter. The viewing area in these illustrative examples is configured to cover a first eye and possibly a second eye.

Figure 8:
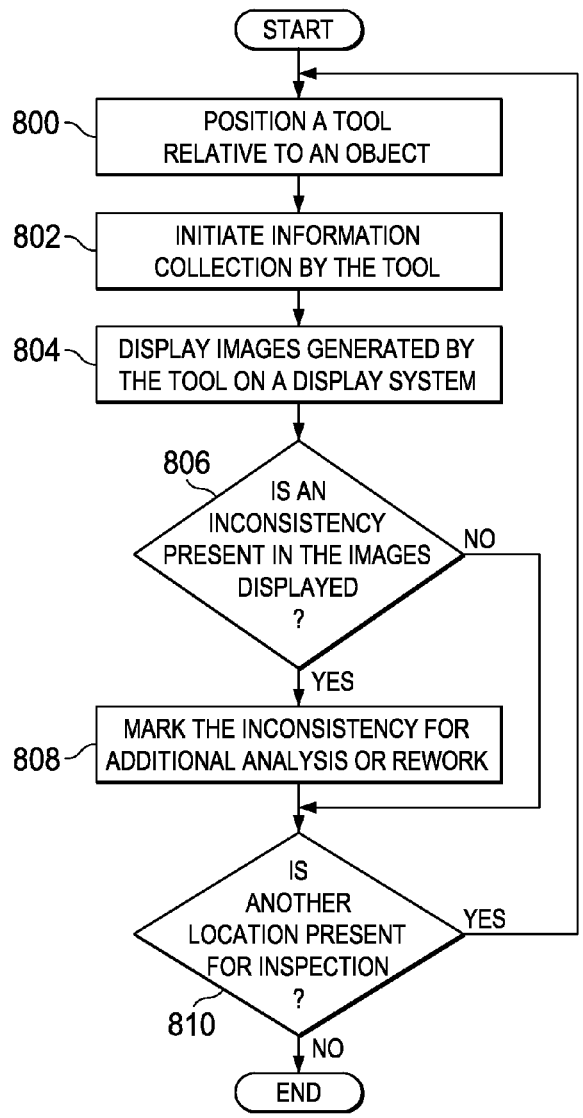
FIG. 8 is an illustration of a flowchart of a process for inspecting an object using a nondestructive inspection system in accordance with an illustrative embodiment.

Turning now to FIG. 8, an illustration of a flowchart of a process for inspecting an object using a nondestructive inspection system is depicted in accordance with an illustrative embodiment. The process illustrated in FIG. 8 may be performed by an operator using tool system 500 in FIG. 5.

The process begins by positioning a tool relative to an object (operation 800). The tool may take various forms such as a borescope, an ultrasonic inspection system, and other suitable types of devices. In this illustrative example, the object may be, for example, aircraft 102 in FIG. 1.

Information collection by the tool is initiated (operation 802). In these illustrative examples, the information collection may include data that may be used to form images. Images generated by the tool are displayed on a display system (operation 804). In this illustrative example, the display system may be augmented reality glasses such as augmented reality glasses 600 in FIG. 6.

A determination is made as to whether an inconsistency is present in the images displayed (operation 806). If an inconsistency is present, the inconsistency is marked for additional analysis or rework (operation 808). In this case, the operator may physically mark the object or may mark the image. The image may be saved for later use.

A determination is then made as to whether another location is present for inspection (operation 810). If another location is present for inspection, the process returns to operation 800 as described above. Otherwise, the process terminates.

With reference again to operation 806, if an inconsistency is not present, the process proceeds to operation 810 as described above.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Of course the tool system may be used to perform other tasks in addition to or in place of nondestructive inspection as illustrated in the different operations in FIG. 8. For example, operations such as forming a hole, installing a fastener or other suitable operations may be performed prior to inspecting the hole or fastener. In other words, the tool system may also perform inspections or different tool systems may be used for the different operations for different tasks. Further, operations such as displaying instructions for operating the tool or performing the inspection may be added to the operations in FIG. 8 in some illustrative examples.

Figure 9:
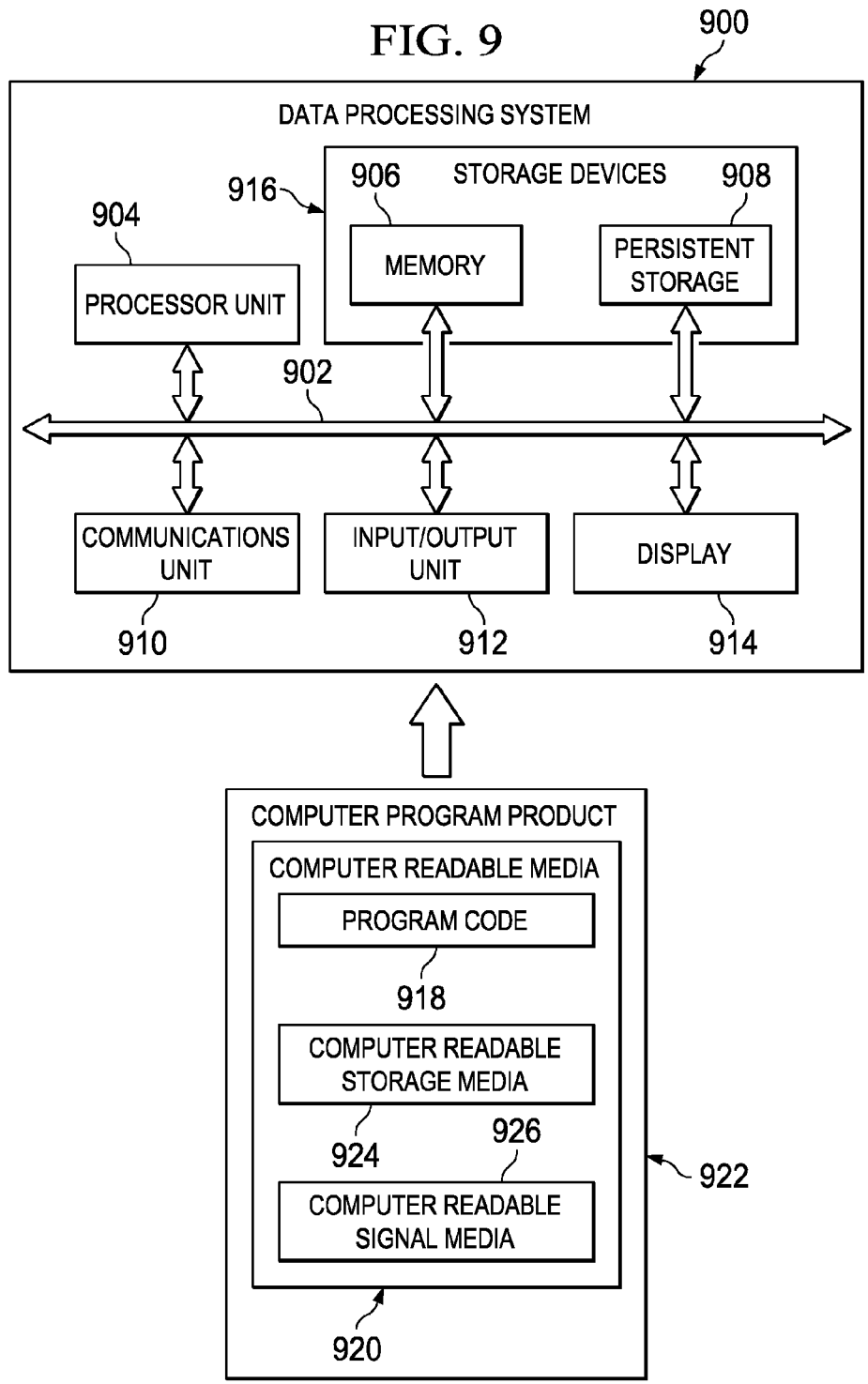
FIG. 9 is an illustration of a block diagram of a data processing system in accordance with an illustrative embodiment.

Turning now to FIG. 9, an illustration of a block diagram of a data processing system is depicted in accordance with an illustrative embodiment. Data processing system 900 may be used to implement computer 122 in FIG. 1, computer system 216 in FIG. 2, and other suitable components. In this illustrative example, data processing system 900 includes communications framework 902, which provides communications between processor unit 904, memory 906, persistent storage 908, communications unit 910, input/output (I/O) unit 912, and display 914. In this example, communication framework may take the form of a bus system.

Processor unit 904 serves to execute instructions for software that may be loaded into memory 906. Processor unit 904 may be a number of processors, a multi-processor core, or some other type of processor, depending on the particular implementation.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these illustrative examples. In one example, computer readable media 920 may be computer readable storage media 924 or computer readable signal media 926.

In these illustrative examples, computer readable storage media 924 is a physical or tangible storage device used to store program code 918 rather than a medium that propagates or transmits program code 918.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 900 are not meant to provide architectural limitations to the manner in which different embodiments may be implemented. The different illustrative embodiments may be implemented in a data processing system including components in addition to and/or in place of those illustrated for data processing system 900. Other components shown in FIG. 9 can be varied from the illustrative examples shown. The different embodiments may be implemented using any hardware device or system capable of running program code 918.

Figure 10:
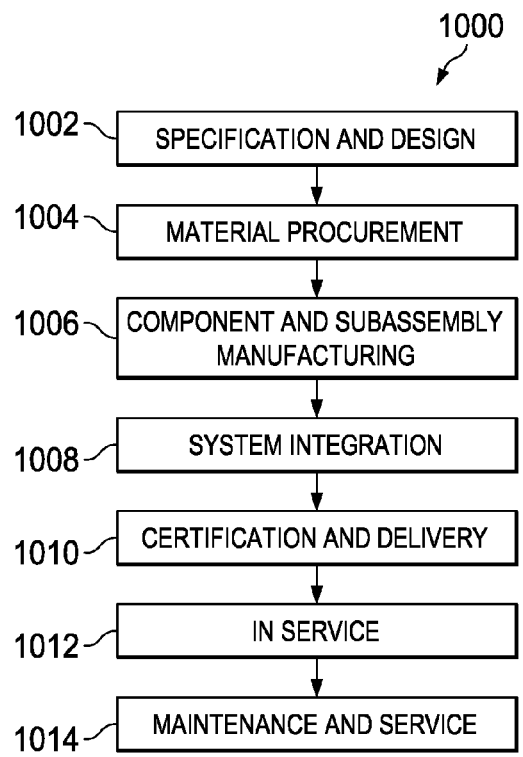
FIG. 10 is an illustration of an aircraft manufacturing and service method in accordance with an illustrative embodiment.
Figure 11:
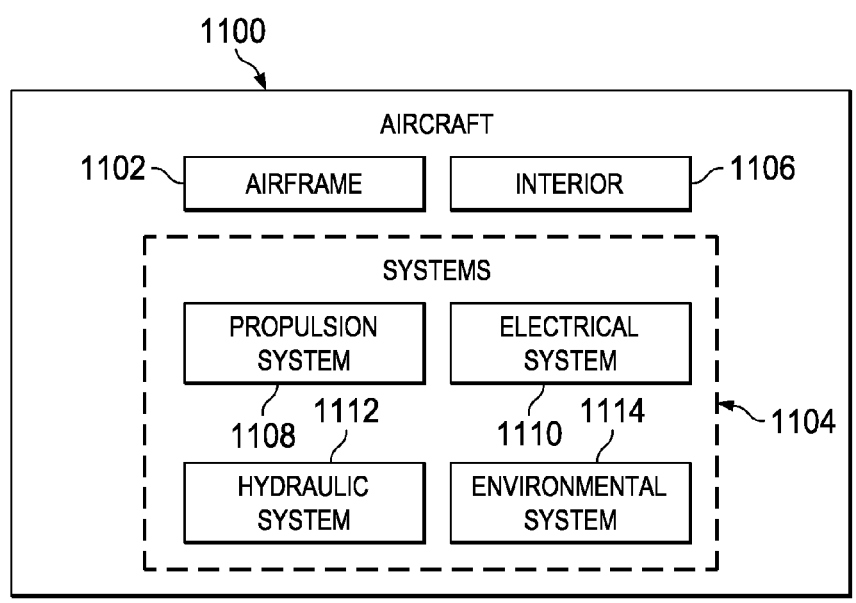
FIG. 11 is an illustration of an aircraft in which an illustrative embodiment may be implemented.

Illustrative embodiments of the disclosure may be described in the context of aircraft manufacturing and service method 1000 as shown in FIG. 10 and aircraft 1100 as shown in FIG. 11. Use of plurality of tools systems 214 by group of operators 202 in FIG. 2 may be performed during aircraft manufacturing and service method 1000. Further, aircraft 1100 may be an example of aircraft 102 in FIG. 1.

Turning first to FIG. 10, an illustration of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000 in FIG. 10.

One or more illustrative embodiments may be implemented during component and subassembly manufacturing 1006 to manufacture subassemblies and components. In another illustrative example, an illustrative embodiment may be implemented during system integration 1008 to perform tasks involved in assembling parts to form aircraft 1100. Further, the different illustrative embodiments also may be implemented during maintenance and service 1014 to perform various tasks including inspections of aircraft 1100 and components in aircraft 1100.

The different illustrative embodiments may be applied to various types of environments in which tools are used to perform tasks. For example, the different illustrative embodiments may be applied to a maintenance environment that is present during maintenance and service 1014. In still other illustrative examples, one or more illustrative embodiments may be implemented in a manufacturing environment used in component and subassembly manufacturing 1006. The use of a number of the different illustrative embodiments may substantially expedite the assembly of and/or reduce the cost of aircraft 1100.

Thus, one or more illustrative embodiments may allow for performing tasks in a desired manner. Tasks may be performed more quickly, with less cost, and more efficiently using one or more illustrative embodiments. By displaying information in a viewing area on a display system to an operator, the operator may perform tasks based on information received from the tool. Further, the display of the information is such that the vision of the operator may still be used to move about the environment, position the tool, and perform other tasks in addition to or in place of viewing the information received from the tool.

In still other illustrative examples, information may be sent to the operator for display on the display system from a task manager. This information may aid the operator in using the tool more efficiently, especially when the operator may not have the experience or knowledge to perform tasks with the tool as quickly as desired.

With one or more illustrative embodiments, increased efficiency in performing tasks using tools may occur. Additionally, with one or more illustrative embodiments, increased safety in performing tasks with tools also may be present. One or more illustrative embodiments display information in a manner that allows an operator to see other objects or features on objects while operating the tool.

For example, an operator may see an image generated by a borescope and still see other objects around the operator through peripheral vision of the operator. Thus, the operator may manipulate the position of the borescope, observe images generated by the borescope, and transmit images for storage or analysis.

Further, with the use of an illustrative embodiment, an operator may capture images more easily. For example, an operator may press a single switch button attached to the borescope placement handle, a button on the augmented reality glasses, say a command, or some combination thereof to capture an image of the viewing area of the operator. This image capture feature allows the operator to capture still images, video, or still images and video for use in other applications. As an example, this image data from an operator may be sent to an expert. That expert may analyze the images and provide the operator with instructions for maintenance of an aircraft.

The description of the different illustrative embodiments has been presented for purposes of illustration and description, and is not intended to be exhaustive or limited to the embodiments in the form disclosed. Many modifications and variations will be apparent to those of ordinary skill in the art.

For example, a code may be needed for the tool system to operate as desired. For example the tool system may need a code to properly display the information. For example, images may not be displayed or may not be displayed with a desired level of clarity on the display system. Also, information may not be transmitted from the tool to the display system or other destination without a code. The code may be used to ensure proper licensing of the tool system. In some illustrative examples, the information may be viewed but may not be transmitted for storage or use by other devices. The control on the operation may be implemented in hardware, software, or some combination thereof. The controls may be located in one or more components, including at least one of the tool, the display system, and other suitable components.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a display system having a viewing area that is substantially transparent, wherein the viewing area is configured to cover an eye and display information for a task in the viewing area; and
a tool configured for use in the task, wherein the tool is in communication with the display system, the tool comprising:
  a camera system configured to generate video data about a portion of an object on which the task is performed; and
  a transmitter configured to transmit the video data to the display system;
wherein information displayed in the viewing area includes the video data generated by the camera system and schematics representing the portion of the object on which the task is performed;
wherein the information displayed in the viewing area includes instructions comprising graphical indicators displayed on the display system such that the graphical indicators are aligned with locations where holes are to be drilled.

2. The apparatus of claim 1:
wherein the tool is a borescope configured to be placed into an opening in an engine of an aircraft to perform inspections of interior portions of the engine, wherein the camera system associated with the tool is a first camera system;
wherein the display system is selected from one of augmented reality glasses and a contact lens display, the display system further comprising a second camera system configured to generate second video data about performance of the task on the portion of the object, wherein the second video data is a record of the task performed using the tool;
wherein the display system sends first video data received from the tool and the second video data to a computer system;
wherein the apparatus further comprises a computer system, the computer system being configured: to receive the first video data and the second video data and record the task performed using the tool to perform the task; to send task information about the task to the display system for display on the display system, wherein the task information comprises instructions for performing the task that are displayed in the viewing area while an operator operates the tool to perform the task; and to control a number of parameters of the tool while the operator performs the task using the tool.

3. A task system comprising:
a plurality of tool systems, wherein a tool system in the plurality of tool systems comprises a display system having a viewing area that is substantially transparent, wherein the viewing area is configured to cover an eye and display information for a task in the viewing area and a tool configured for use in the task, wherein the tool is in communication with the display system, wherein information includes video data generated by a camera system associated with the tool and schematics representing a portion of an object on which the task is performed;
a task database; and
a task manager configured to communicate with the plurality of tool systems and manage tasks performed with the plurality of tool systems using the task database;
wherein the information displayed in the viewing area includes instructions comprising graphical indicators displayed on the display system such that the graphical indicators are aligned with locations where holes in a skin panel of an aircraft are to be drilled so that as an operator moves in relation to the skin panel, the graphical indicators move such that the graphical indicators remain on the locations in the skin panel of the aircraft where the holes are to be drilled.

4. The task system of claim 3,
wherein the task database includes task information for performing the task and wherein the task manager sends the task information for performing the task to the tool system for use in performing the task;
wherein the task information is selected from one or more of instructions, parameters, or program code;

wherein the information is received from the tool; and
wherein the task manager is configured to store information received from the tool system in the task database.

5. A method for performing a task, the method comprising:
performing the task using a tool; and
displaying information received by a display system from the tool on a viewing area that is substantially transparent in the display system, wherein the viewing area is configured to cover an eye and display the information in the viewing area, and wherein the information includes video data generated by a camera system associated with the tool and schematics representing a portion of an object on which the task is performed;
using a voice-to-text feature with a microphone in the display system to record operator notes via auditory data so that a processor translates the auditory data to text form and adds the auditory data to a logbook;
displaying graphical indicators in the viewing area such that the graphical indicators are aligned with locations where holes in a skin panel of an aircraft are to be drilled using the tool so that as an operator moves in relation to the skin panel, the graphical indicators move such that the graphical indicators remain on the locations in the skin panel of the aircraft where the holes are to be drilled; and
wherein the display system is a set of augmented reality glasses.

6. The method of claim 5, further comprising:
receiving task information from a task manager;
displaying the task information while performing the task;
generating the video data of a performance of the task; and
sending the video data to a task manager;
wherein displaying the information received by the display system from the tool on the viewing area that is substantially transparent in the display system comprises: displaying images on the viewing area.

* * * * *